United States Patent
Janssen

(10) Patent No.: US 9,009,745 B2
(45) Date of Patent: Apr. 14, 2015

(54) THIN WEB OPTICAL MEDIA GUIDING METHOD

(71) Applicant: Oracle International Corporation, Redwood City, CA (US)

(72) Inventor: Clark M. Janssen, Loveland, CO (US)

(73) Assignee: Oracle International Corporation, Redwood City, CA (US)

(*) Notice: Subject to any disclaimer, the term of this patent is extended or adjusted under 35 U.S.C. 154(b) by 0 days.

(21) Appl. No.: 13/677,511

(22) Filed: Nov. 15, 2012

(65) Prior Publication Data

US 2014/0137138 A1 May 15, 2014

(51) Int. Cl.
| | |
|---|---|
| *G11B 7/08* | (2006.01) |
| *G11B 15/60* | (2006.01) |
| *G11B 15/61* | (2006.01) |
| *G11B 15/32* | (2006.01) |
| *G11B 7/003* | (2006.01) |

(52) U.S. Cl.
CPC .............. *G11B 15/60* (2013.01); *G11B 7/003* (2013.01); *G11B 15/61* (2013.01); *G11B 15/32* (2013.01)

(58) Field of Classification Search
CPC ...... G11B 7/003; G11B 23/087; G11B 15/60; G11B 15/61; G11B 15/62; G11B 23/04; G11B 7/09; G11B 15/605; G11B 15/67
USPC ............... 226/189, 190, 194; 242/324, 326.4, 242/332.4, 341, 346, 346.2, 615.4; 360/130.21, 83, 85; 369/13.37; 720/746
See application file for complete search history.

(56) References Cited

U.S. PATENT DOCUMENTS

| | | | |
|---|---|---|---|
| 3,270,933 A * | 9/1966 | Dekker | 226/42 |
| 4,514,055 A | 4/1985 | Grant | |
| 4,970,707 A | 11/1990 | Hara et al. | |
| 5,284,308 A * | 2/1994 | Comeaux et al. | 360/96.1 |
| 5,513,163 A | 4/1996 | Kim | |
| 5,661,704 A * | 8/1997 | Van Rosmalen | 369/44.14 |
| 5,995,269 A * | 11/1999 | Van Rosmalen | 359/209.1 |
| 6,215,618 B1 * | 4/2001 | Anderson et al. | 360/128 |
| 6,336,608 B1 * | 1/2002 | Cope | 242/615.12 |
| 6,435,451 B1 * | 8/2002 | Leonhardt | 242/614 |
| 6,690,639 B2 * | 2/2004 | Brewen | 720/746 |
| 6,938,851 B2 * | 9/2005 | Davis | 242/615.2 |
| 7,173,794 B2 * | 2/2007 | Molstad et al. | 360/251 |

(Continued)

FOREIGN PATENT DOCUMENTS

| | | |
|---|---|---|
| EP | 0 383 588 A1 | 8/1990 |
| JP | 62228713 A * | 10/1987 |

(Continued)

OTHER PUBLICATIONS

International Search Report dated Feb. 3, 2014 in PCT/US2013/068880 filed Nov. 7, 2013, 4 pgs.

*Primary Examiner* — Will J Klimowicz
(74) *Attorney, Agent, or Firm* — Brooks Kushman P.C.

(57) ABSTRACT

An optical data storage device includes an optical storage tape having one or more optical storage layers. A plurality of optical pickup units reads and/or writes data to the optical storage tape. A feed reel provides the optical storage tape to the optical pickup units. A guiding wheel that guides the optical storage tape when the optical storage tape is in the vicinity of the optical pickup units during read and/or write operations. Finally, a take-up reel receives the optical storage tape from the guiding wheel.

20 Claims, 4 Drawing Sheets

(56) References Cited

U.S. PATENT DOCUMENTS

| | | | |
|---|---|---|---|
| 7,204,445 B2* | 4/2007 | Johnson et al. | 242/346.2 |
| 7,204,446 B2* | 4/2007 | Johnson et al. | 242/346.2 |
| 7,209,425 B2* | 4/2007 | Hara et al. | 369/97 |
| 7,369,483 B2* | 5/2008 | Slafer et al. | 369/275.4 |
| 8,189,432 B2* | 5/2012 | Mahnad | 369/44.13 |
| 2004/0205957 A1 | 10/2004 | Athanasiou et al. | |
| 2004/0233820 A1 | 11/2004 | Hara et al. | |
| 2007/0206477 A1 | 9/2007 | Raniuk et al. | |
| 2010/0035088 A1* | 2/2010 | Inoue | 428/846 |
| 2010/0102156 A1* | 4/2010 | McAllister et al. | 242/348 |
| 2011/0141863 A1* | 6/2011 | Mahnad | 369/44.13 |
| 2011/0318506 A1 | 12/2011 | Kim | |
| 2011/0318534 A1 | 12/2011 | Kim | |

FOREIGN PATENT DOCUMENTS

| | | | |
|---|---|---|---|
| JP | 63206942 A | * | 8/1988 |
| JP | 02287958 A | * | 11/1990 |
| JP | 03171443 A | * | 7/1991 |
| JP | 03270925 A | * | 12/1991 |
| JP | 2004054986 A | * | 2/2004 |
| JP | 2006048915 A | * | 2/2006 |

* cited by examiner

THIN WEB OPTICAL MEDIA GUIDING METHOD

In at least one aspect, the present invention relates to devices for storing digital data onto optical media, and in particular, to devices for storing digital storage data onto an optical storage tape.

BACKGROUND OF THE INVENTION

The ever expanding amount of digital data provides an impetus for the continuing development of high capacity storage solutions. Technologies that are suitable for these applications include optical tape, magnetic tape, and optical disks. Of these possibilities, optical tape technology is believed to provide the greater storage capacity.

Optical storage devices utilize laser light to write and read data to an optically active storage disk that includes one or more optically sensitive layers onto which data is encoded. Such disks may or may not be rewritable depending on the specific compositions used on the disk and on the electromechanical design of the optical storage device. Examples of optical disks include compact disks (CD), DVDs, Ultra Density Optical disks, Blue Ray disks, and the like.

The typical optical tape medium includes a base film such as polyethylene naphthalate (PEN) over-coated with multiple layers for recording digital data. A polymeric imprint layer is usually disposed over the base film. In one type of optical tape, the imprint layer is over-coated with a reflective metallic layer that is, in turn, over-coated with a sequence of dielectric layer, phase change layer, and dielectric layer. The actual data recording and reading occurs in the phase change layer. In a typical application, a pulsed laser beam is projected from an optical head assembly onto the optical tape thereby causing a phase change in the phase change layer that results in data being encoded therein. Data encoded onto the optical tape is also read with a laser with the reflective layer reflecting light to a detector. Moreover, optical tape usually includes optical servo marks embossed into the imprint layer along the length of the tape for operating with a servo control system for controlling the optical head. Although the current optical tape technology works reasonably well, there are a number of problems related to the polymeric imprint layer.

Magnetic data storage is another common technology used to store digital information. In this technology, magnetic storage uses magnetic patterns which are encoded onto a magnetically coated surface to store data. Normally, data is encoded on magnetic media that is a thin web (i.e, a tape) that is wrapped inside of a cartridge. Magnetic heads are used to read/write data from the thin web. In a typical magnetic storage drive, the web is sent through a tape drive and a recording head that is typically magnetic in nature that gets close to the magnetic surface and records data on it. Typically, data storage disks have much higher storage density because the thin web tends to move in undesired directions. Therefore, registration is very important in the prior art magnetic storage designs.

Accordingly, the present invention provides improved methods and systems for storing digital data onto optical media with data transfer rates that approach that of optical storage disks.

SUMMARY OF THE INVENTION

The present invention solves one or more problems of the prior art by providing in at least one embodiment an optical storage device. The optical data storage device includes an optical storage tape having one or more optical storage layers. A plurality of optical pickup units reads and/or writes data to the optical storage tape (e.g., an optical storage tape). A feed reel provides the optical storage tape to the optical pickup units. The optical storage device also includes a guiding wheel. The guiding wheel guides the optical storage tape when the optical storage tape is in the vicinity of the optical pickup units during read and/or write operations. Finally, a take-up reel receives the optical storage tape from the guiding wheel. Spatial separation between the optical pickup units and the optical storage tape allows reading and writing of data without touching the optical storage tape. Advantageously, the guiding wheel of the present embodiment securely holds the optical storage tape on a curved (i.e., circular) path during read/write/tracking operations thereby allowing storage densities to approach that of optical disks.

In another embodiment, an optical data storage device is provided. The optical storage device includes a feed reel adapter for holding a feed reel having an optical storage tape and a plurality of optical pickup units for reading and writing data to the optical storage tape. The optical storage device also includes a guiding wheel for guiding the optical storage tape when the optical storage tape is in the vicinity of the optical pickup units during read and/or write operations. Finally, the optical storage device also includes a take-up reel adapter for holding a take-up reel that receives the optical storage tape from the guiding wheel.

In still another embodiment, a method of storing data on an optical storage tape is provided. The method utilizes the optical storage devices set forth above. The method includes a step of providing the optical storage tape to a guiding wheel such that the optical storage tape moves along an arced path when the optical storage tape contacts the guiding wheel. Data is read or written to the optical storage tape by a plurality of optical pickup units positioned about the guiding wheel. The optical storage tape is subsequently received onto a take-up reel.

BRIEF DESCRIPTION OF THE DRAWINGS

Exemplary embodiments of the present invention will become more fully understood from the detailed description and the accompanying drawings, wherein.

DESCRIPTION OF THE INVENTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: the description of a group or class of materials as suitable or preferred for a given purpose in connection with the invention implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
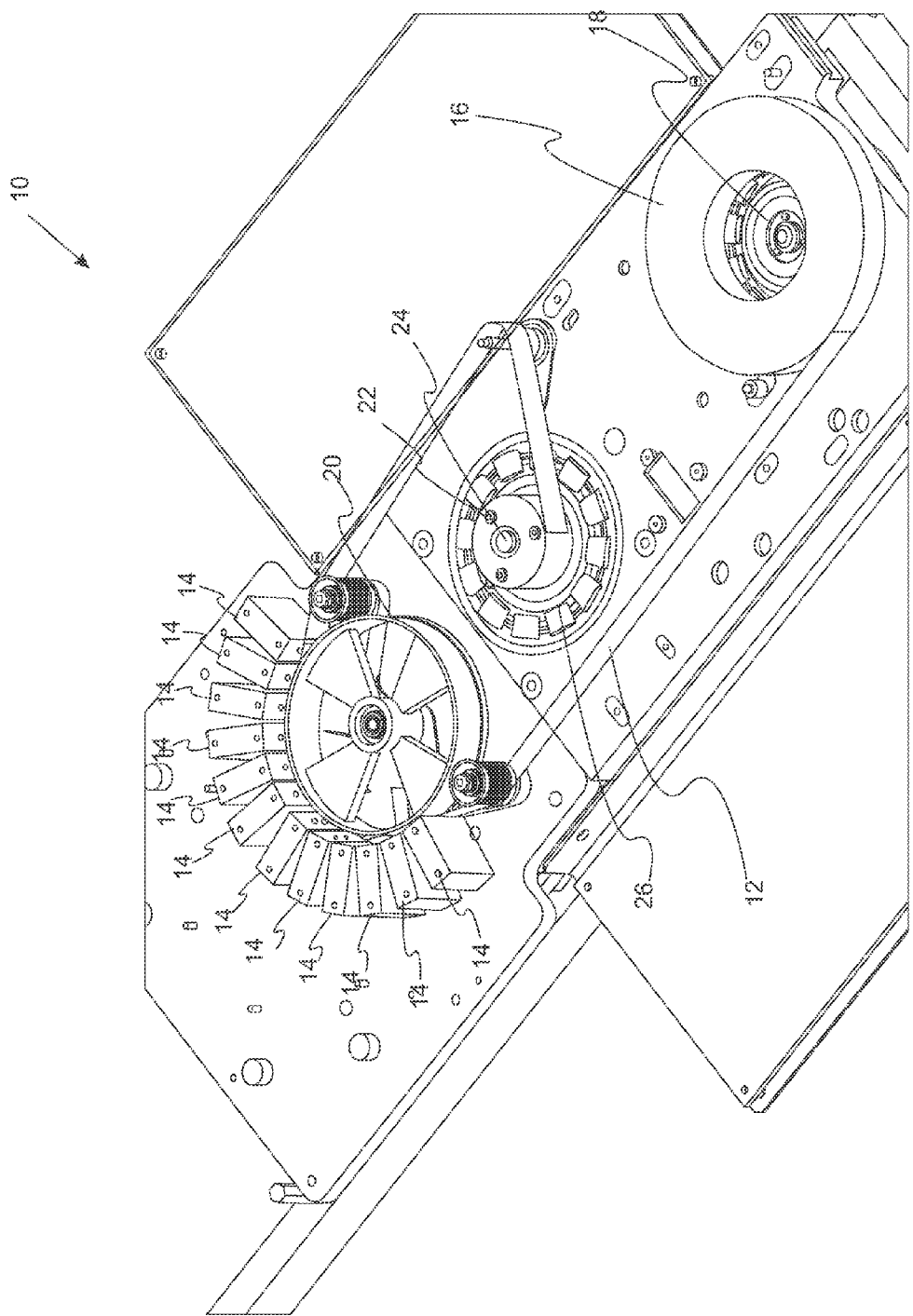
FIG. 1 provides a schematic illustration of an optical data storage device using an optical storage tape.

With reference to FIG. 1, a perspective schematic view of an optical data storage device is provided. Optical data storage device 10 writes to, reads from, and/or tracks optical storage tape 12. Optical storage tape 12 includes one or more optical storage layers onto which device 10 encodes digital data. Optical pickup units (OPU) 14 read, write, and/or track data to optical storage tape 12. Typically, the distance of the OPU from the tape is about 0.1 to 0.8 mm. A feed reel 16 provides the optical storage tape to optical pickup units 14. Feed reel 16 is received and held by feed reel adapter 18. Optical storage device 10 also includes guiding wheel 20 that guides the optical storage tape 10 when the optical storage tape 10 is in the vicinity of the optical pickup units 14 during read and/or write and/or tracking operations. Advantageously, guiding wheel 20 securely holds optical storage tape 12 on an curved path (i.e., circular path) during read/write/tracking operations thereby allowing storage densities to approach that of optical disks. Take-up reel 22 receives the optical storage tape 12 from the guiding wheel 20. Take-up reel 22 is held in place by take-up reel adapter 24 which is driven in a circular direction by electric motor 26.

Still referring to FIG. 1, optical data storage device 10 further optionally includes first guiding post 30 for positioning the storage tape 12 before contacting guiding wheel 20 and second guiding post 32 for positioning optical storage tape 12 after disengaging guiding wheel 20.

Figure 2A:
FIG. 2A is a top view of an optical storage tape surface.
Figure 2B:
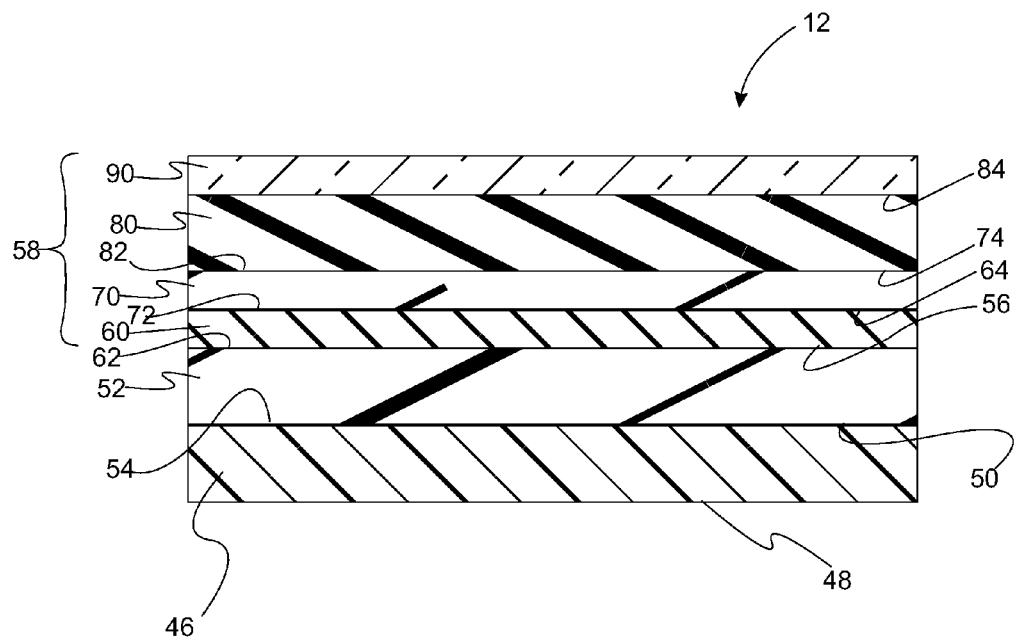
FIG. 2B is a cross sectional view of an optical storage tape.

With reference to FIGS. 2A and 2B, schematic illustrations of an optical storage tape used in the storage devices set forth above is provided. FIG. 2A is a top view of an optical storage tape surface while FIG. 2B is a cross sectional view of an optical storage tape. Optical storage tape 12 includes a plurality of data tracks 40. Although the storage tape is compatible with virtually any number of data tracks, 200 to 600 data tracks are typical. In a refinement, data tracks 40 are configured in a logical track format across a width of the optical storage tape.

An example of an optical storage tape that may be used in the current embodiment is provided by U.S. Pat. Pub. Nos. 2011/0318506 and 2011/0318534, the entire disclosures of which are hereby incorporated by reference. It should be appreciated that any number of designs may be used for storage tape 12, each of which include one or more optical storage layers onto which device 10 encodes digital data. Optical tape 12 includes substrate base layer 46 having substrate film sides 48, 50. Typically, base layer 46 is formed from polyester or other polymeric materials. Examples of such materials include, but are not limited to, polyethylene terephthalate (PET), polyethylene naphthalate (PEN), aramid, and the like, and combinations thereof. Imprint layer 52 is disposed over substrate film side 50. Imprint layer 52 includes imprint layer side 54 and imprint layer side 56 with imprint layer side 54 being more proximate to substrate base layer 46. Multilayer data recording section 58 is disposed over imprint layer 52. Multilayer data recording section 58 typically includes one or more layers involved in the optical recording of data. Multilayer data recording section 58 includes metal layer 60 disposed over imprint layer side 56. Metal layer 60 includes metal layer side 62 and metal layer side 64. Metal layer side 62 is more proximate to imprint layer 52 than metal layer side 64. Multilayer data recording section 58 also includes dielectric layer 70 disposed over metal layer side 64. Dielectric layer 70 includes dielectric layer side 72 and dielectric layer side 74 which is more distal to metal layer 60. Multilayer data recording section 58 further includes phase change layer 80 which is disposed over dielectric layer 70. Phase change layer 80 includes phase change layer side 82 and phase change layer side 84 which is more distal to dielectric layer 70. In this context, phase change layer 80 is the actual layer onto which data is encoded by optical tape storage system 10 (FIG. 1). Multilayer data recording section 58 also includes dielectric layer 90 disposed over phase change layer side 84.

Figure 3:
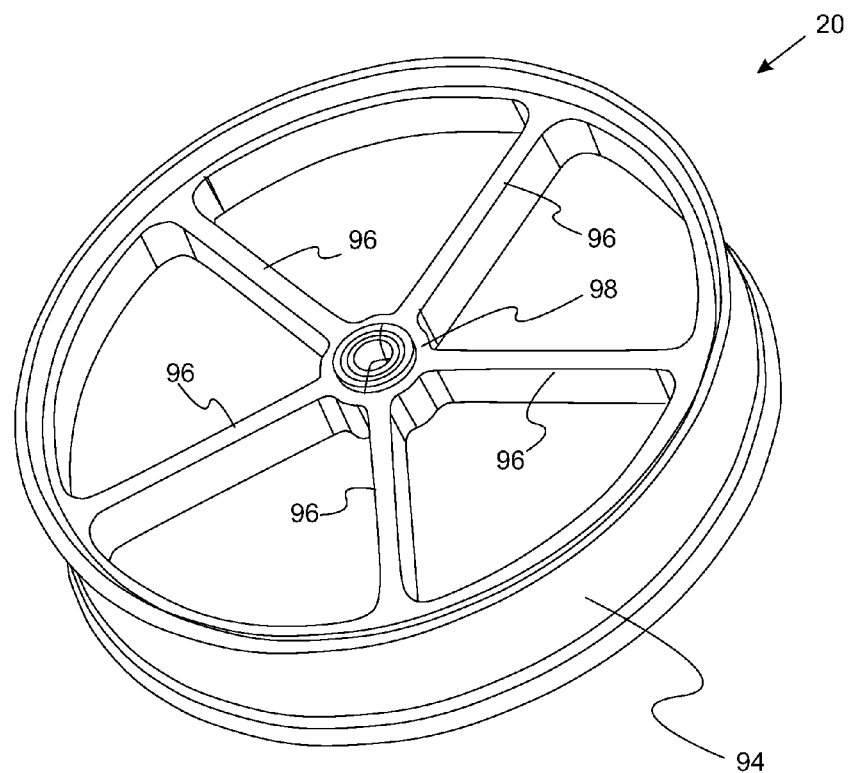
FIG. 3 is a perspective view of a guiding wheel used in the optical tape storage device.
Figure 4:
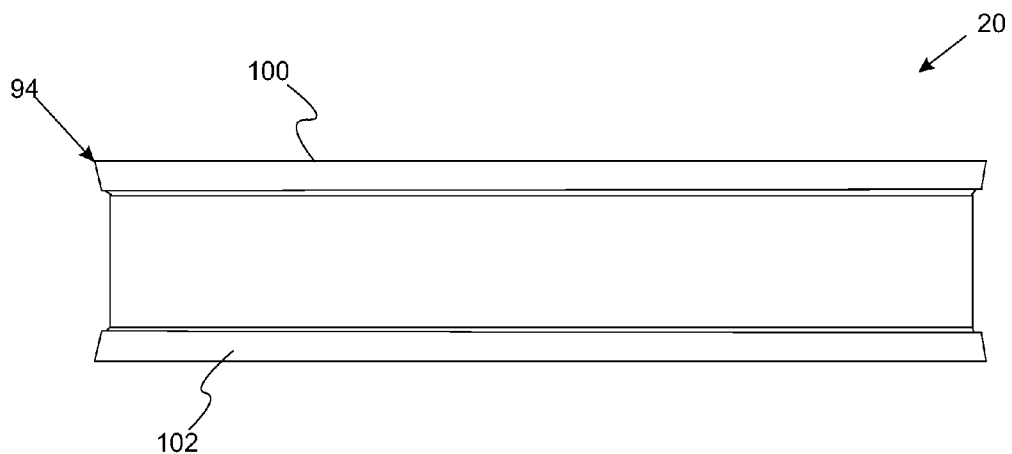
FIG. 4 is a side view of a guiding wheel used in the optical tape storage device.

With reference to FIGS. 3 and 4, schematic illustrations of guiding wheels used to guide and stably hold the optical storage tape for read/write/tracking operations in the optical storage device are provided. FIG. 3 is a perspective view of a guiding wheel used in the optical tape storage device. FIG. 4 is a side view of a guiding wheel used in the optical tape storage device. Guiding wheel 20 includes a circular outer portion 94 that contacts the storage tape. Spokes 96 connect circular outer portion 94 to inner hub 98. Virtually any type of material may be used for the construction of guiding wheel 20. For example, non-magnetic materials such as aluminum, magnesium, titanium, plastics, and metal-coated plastics may be used to construct guiding wheel 20. In a refinement, guiding wheel 20 includes edge guides 100, 102 for holding the optical storage tape in place.

Figure 5:
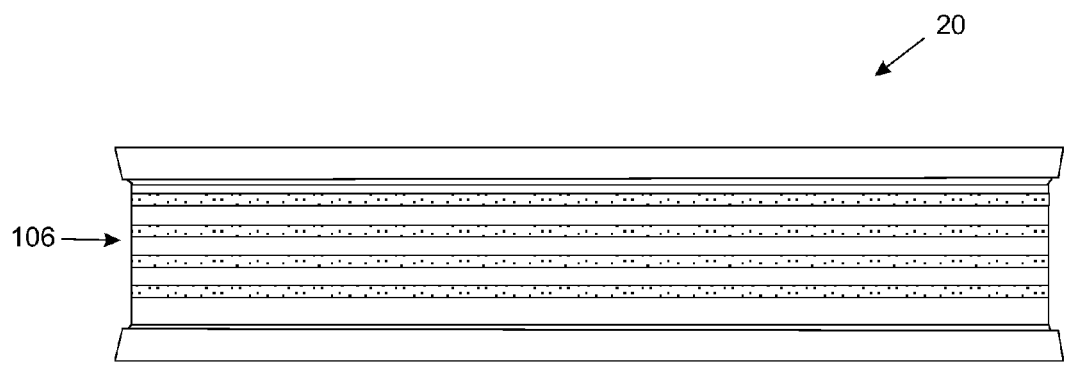
FIG. 5 is a side view of a guiding wheel having a plurality of grooves.
Figure 6:
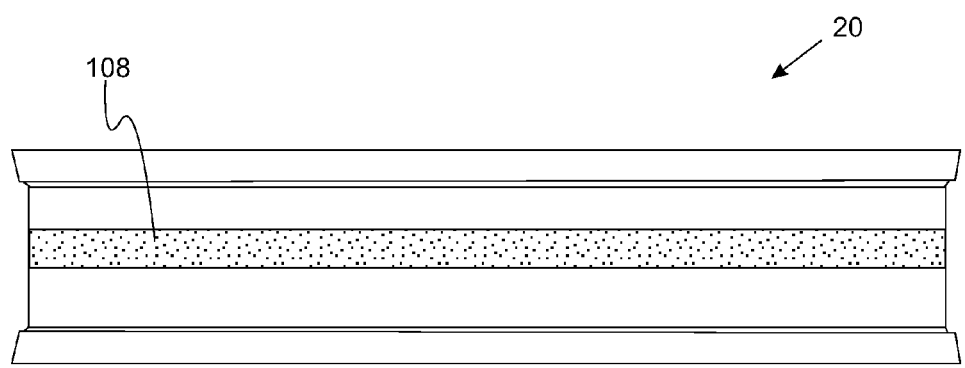
FIG. 6 is a side view of a guiding wheel having a central groove.

With reference to FIGS. 1, 5 and 6, schematic designs of guiding wheels having reduced air film formation are provided. During operation of the optical storage system 10, guiding wheel 20 spins about at a high rate. Drag forces and the viscosity of air combine to form an air film that acts to push optical storage tape 12 away from guiding wheel 20. One solution for the formation of such air films is the incorporation of one or more grooves that assist in maintaining contact between the optical storage tape and the guiding wheel by providing a space for air to escape into. FIG. 5 provides a variation of guiding wheel 20 which includes a plurality of grooves 106 into which air can escape into thereby mitigating the effect of an air film being formed. FIG. 6 provides another variation in which guiding wheel 20 includes central groove 108 into which air can escape thereby reducing the effects of an air film. In other variations, guiding wheel 20 comprises a porous material (e.g. porous metal or polymer) that assists in maintaining contact between the optical storage tape and the guiding wheel by allowing air to escape into or out of the guiding wheel. It should be appreciated that each of these air film solutions can be used singly or in combination.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An optical data storage device comprising:
   an optical storage tape having one or more optical storage layers;
   a plurality of optical pickup units for reading and writing data to the optical storage tape;
   a feed reel for providing the optical storage tape to the optical pickup units;
   a guiding wheel rotatably disposed on an axis of rotation, for guiding the optical storage tape when the optical storage tape is in the vicinity of the optical pickup units during read and/or write operations, the guiding wheel holding the optical storage tape on a planar circular path during read/write/tracking operations; the plurality of optical pickup units being disposed about an outer circumference of the guiding wheel, wherein a distance between the axis of rotation of the guiding wheel and each of the plurality of optical pickup units is substantially equal, such that the spacing between each of the plurality of optical pickup units and the optical storage tape held on the guiding wheel during read/write/tracking operations is substantially uniform; and
   a take-up reel for receiving the optical storage tape from the guiding wheel.

2. The optical data storage device of claim 1 further comprising a first guiding post for positioning the storage tape before contacting the guiding wheel and a second guiding post for positioning the optical storage tape after disengaging the guiding wheel.

3. The optical data storage device of claim 1 wherein the optical storage tape has a plurality of data tracks.

4. The optical data storage device of claim 3 wherein the optical storage tape includes from 200 to 600 data tracks.

5. The optical data storage device of claim 3 wherein the data tracks are configured in a logical track format across a width of the optical storage tape.

6. The optical data storage device of claim 1 wherein the guiding wheel is non-magnetic.

7. The optical data storage device of claim 1 wherein the guiding wheel comprises aluminum, magnesium, titanium, plastics, and metal-coated plastics.

8. The optical data storage device of claim 1 wherein the guiding wheel includes one or more grooves that assist in maintaining contact between the optical storage tape and the guiding wheel.

9. The optical data storage device of claim 1 wherein the guiding wheel comprises a porous metal that assists in maintaining contact between the optical storage tape and the guiding wheel.

10. The optical data storage device of claim 1 wherein the optical storage tape includes a base layer over which the optical storage layers are disposed.

11. The optical data storage device of claim 10 wherein the one or more optical storage layers are disposed over the base layer.

12. The optical data storage device of claim 11 wherein the base layer includes a component selected from the group consisting of polyethylene terephthalate (PET), polyethylene naphthalate (PEN), aramid, and combinations thereof.

13. The optical data storage device of claim 1 wherein the guiding wheel includes edge guides for holding the optical storage tape in place.

14. An optical data storage device comprising:
    a feed reel adapter for holding a feed reel having an optical storage tape;
    a plurality of optical pickup units for reading and writing data to the optical storage tape;
    a guiding wheel rotatably disposed on an axis of rotation, for guiding the optical storage tape when the optical storage tape is in the vicinity of the optical pickup units during read and/or write operations, the guiding wheel holding the optical storage tape on a planar circular path during read/write/tracking operations; the plurality of optical pickup units being disposed about an outer circumference of the guiding wheel, wherein a distance between the axis of rotation of the guiding wheel and each of the plurality of optical pickup units is substantially equal, such that the spacing between each of the plurality of optical pickup units and the optical storage tape held on the guiding wheel during read/write/tracking operations is substantially uniform; and
    a take-up reel adapter for holding a take-up reel that receives the optical storage tape from the guiding wheel.

15. The optical data storage device of claim 14 further comprising a first guiding post for positioning the storage tape before contacting the guiding wheel and a second guiding post for positioning the optical storage tape after disengaging the guiding wheel.

16. The optical data storage device of claim 14 wherein the guiding wheel includes one or more grooves that assist in maintaining contact between the optical storage tape and the guiding wheel.

17. The optical data storage device of claim 14 wherein the guiding wheel comprises a porous metal that assists in maintaining contact between the optical storage tape and the guiding wheel.

18. The optical data storage device of claim 14 wherein optical storage tape includes a base layer over which the optical storage layers are disposed.

19. The optical data storage device of claim 14 wherein the guiding wheel includes edge guides for holding the optical storage tape in place.

20. A method of storing data on an optical storage tape, the method comprising: providing a guiding wheel rotatably disposed on an axis of rotation;
    providing the optical storage tape to the guiding wheel such that the optical storage tape moves along an arced path when the optical storage tape contacts the guiding wheel;
    reading or writing data to the optical storage tape by a plurality of optical pickup units positioned about the guiding wheel, the guiding wheel holding the optical storage tape on a planar circular path during read/write/tracking operations; the plurality of optical pickup units being disposed about an outer circumference of the guiding wheel, wherein a distance between the axis of rotation of the guiding wheel and each of the plurality of optical pickup units is substantially equal, such that the spacing between each of the plurality of optical pickup units and the optical storage tape held on the guiding wheel during read/write/tracking operations is substantially uniform; and receiving the optical storage tape onto a take-up reel.

\* \* \* \* \*

UNITED STATES PATENT AND TRADEMARK OFFICE
CERTIFICATE OF CORRECTION

| | | |
|---|---|---|
| PATENT NO. | : 9,009,745 B2 | Page 1 of 1 |
| APPLICATION NO. | : 13/677511 | |
| DATED | : April 14, 2015 | |
| INVENTOR(S) | : Janssen | |

It is certified that error appears in the above-identified patent and that said Letters Patent is hereby corrected as shown below:

In the Specification

In column 1, line 48, delete "(i.e," and insert -- (i.e., --, therefor.

In the Claims

In column 6, line 49, in Claim 18, delete "optical storage" and insert -- the optical storage --, therefor.

In column 6, lines 49-50, in Claim 18, delete "the optical" and insert -- optical --, therefor.

Signed and Sealed this
First Day of March, 2016

Michelle K. Lee
*Director of the United States Patent and Trademark Office*